United States Patent
Chen et al.

[11] Patent Number: 6,067,731
[45] Date of Patent: May 30, 2000

[54] MEDICAL SHOE COVER AND METHOD OF FORMING THEREOF

[75] Inventors: Mao-Ching Chen, Arlington; Leslie Edward Blackford, Venus, both of Tex.

[73] Assignee: Johnson & Johnson Medical, Inc., Arlington, Tex.

[21] Appl. No.: 09/256,384

[22] Filed: Feb. 24, 1999

Related U.S. Application Data

[62] Division of application No. 08/418,321, Apr. 7, 1995, Pat. No. 5,926,888.

[51] Int. Cl.[7] .............................................. A43B 1/10
[52] U.S. Cl. ............................... 36/7.3; 36/4; 12/142 EV
[58] Field of Search ........................... 12/142 EV, 142 E; 36/7.3, 4

[56] References Cited

U.S. PATENT DOCUMENTS

| | | |
|---|---|---|
| 1,867,879 | 7/1932 | Crockett . |
| 2,037,113 | 4/1936 | Bodle . |
| 2,092,240 | 9/1937 | Bodle . |
| 2,617,208 | 11/1952 | Marx et al. . |
| 2,789,933 | 4/1957 | Bargmeyer . |
| 4,047,251 | 9/1977 | Stockum . |
| 4,103,439 | 8/1978 | Abramson . |
| 4,188,680 | 2/1980 | Adams . |
| 4,304,021 | 12/1981 | Theodorsen . |
| 4,335,527 | 6/1982 | Pask . |
| 4,598,485 | 7/1986 | Joe et al. . |
| 5,226,245 | 7/1993 | Lamont . |
| 5,367,789 | 11/1994 | Lamont . |
| 5,926,888 | 7/1999 | Chen et al. . |

*Primary Examiner*—Ted Kavanaugh
*Attorney, Agent, or Firm*—Andrew C. Farmer; Theodore J. Shatynski

[57] ABSTRACT

A novel shoe cover for medical uses comprises a one piece unit of thin elastomeric material having a pair of side panels in substantially parallel relation to each other. Each of the side panels has a foot shaped portion, an ankle shaped portion and an outer perimetric edge. A bead shaped perimetric section joins the two side panels at their respective perimetric edges, except at an upper edge of the ankle portions. A traction enhancing embossed pattern is formed on a lower portion of the foot shaped portion of the side panels. A novel method for forming the shoe cover comprises providing a shoe cover form which has substantially parallel lateral sides and a peripheral edge thereabout, which comprises a foot forming portion and an ankle forming portion, which has recesses covering substantially all of the foot forming portion of the first and second sides, and which has a textured surface on a lower portion of the foot forming portion. The method further comprises dipping the form into a solution of coagulant, drying the coagulant, dipping the form into a liquid elastomer preparation, drying the elastomer, and removing the shoe cover from the form.

10 Claims, 4 Drawing Sheets

MEDICAL SHOE COVER AND METHOD OF FORMING THEREOF

This application is a divisional of U.S. application Ser. No. 08/418,321 filed Apr. 7, 1995, now U.S. Pat. No. 5,926,888.

BACKGROUND OF THE INVENTION

FIELD OF THE INVENTION

The invention relates to shoe covers, such as for use in a medical field, such as in an operating room, and to methods for their production. More particularly, the invention relates to shoe covers made of a dipped elastomer and to a dipping process there for employing a narrow profile form.

BACKGROUND INFORMATION

Typically, shoe covers for use in a sterile operating room are formed of a loose fitting cloth or plastic, such as thin polyethylene sheet material or nonwoven fabric which is sewn into a foot shaped configuration. To protect the wearer against seepage of blood through a nonwoven material, such covers may incorporate a layer of fluid impervious material, such as a thermoplastic. Production of such shoe covers requires a complex sewing operation and sewing machinery. Further, as shoe covers of this type are loose fitting they may breathe as the wearer moves causing dust to move in and out of the shoe cover, potentially creating a source of contamination. A tight fitting elastomeric cover, such as may be formed in a dipping process, provides a low cost alternative and alleviates the problem of breathing.

Typically, dipped elastomeric items are produced by a process which involves dipping a bulky porcelain or aluminum form into a solution of coagulant(usually a solution of calcium nitrate in water or alcohol), drying the coagulant and then immersing the form into a latex compound and dwelling for a specific duration. After depositing the desired thickness of latex film on the form, the form is withdrawn from the latex compound and usually rotated throughout the period of time for completion of gelling the latex film. After the film is gelled, it is leached with water to remove any water soluble materials from the deposit, it is dried, vulcanized and stripped from the form as a finished product.

The Abramson U.S. Pat. No. 4,103,439 discloses a shoe cover of the type formed of rubber with a black dispersion suitable for protecting ones shoes in inclement weather and commonly referred to as "rubbers." Abrahamson also indicates that such shoe covers could be employed in industrial clean rooms and the like to assist in maintaining a dust free environment. The form used by Abrahamson is a three dimensional representation of a human foot inside of a shoe.

It has been found that elastomers age best in the static state, that is to say, all other factors being equal, a latex rubber article will age better without being stressed or distorted. Shoe covers formed of the presently available three dimensional forms exhibit folding lines and sharp creases during storage and shipping which can crack and generally degrade when exposed to the deleterious effects of oxygen, ozone or ultra-violet radiation, or to any combinations of these. Consequently, it is desirable to avoid any such sharp creases in the finished shoe cover product if at all possible.

The relatively large surface areas on the three dimensional forms that lie parallel to the liquid surface tend to trap air during dipping causing voids or blisters in the film. Some dipping operations, such as disclosed by Abramson '439, provide a tilting mechanism for tilting the form as it enters the liquid. Of, course this adds complexity to the dipping operations.

Nearly twenty years ago, the Stockum U.S. Pat. No. 4,047,251, issued on Sep. 13, 1977 and incorporated herein by reference, disclosed a flat form useful for producing elastomeric gloves. Compared to conventional three dimensional glove forms, it was cheaper to produce the form, allowed more gloves to be produced in a single dipping operation and solved several other technical problems in the art of glove dipping. However, such technology has apparently not heretofore migrated to the production of shoe covers. The human hand is relatively flat and a flat form for the production of gloves mimics the shape of the human hand fairly acurately. Human feet, especially when shod, have a substantial lateral dimension such that they are not considered flat. Accordingly, it is not obvious that a flat form would produce an acceptable shoe cover.

Further, in protecting medical workers, shoe covers are routinely formed of non-woven fabrics, sometimes incorporating a liquid impervious nonelastic inner layer.

SUMMARY OF THE INVENTION

The present invention eliminate or greatly reduces disadvantages associated with the use of conventional shoe covers, and provides an inexpensive elastomeric shoe cover capable of protecting a wearer against potentially contaminated fluids. Further, its unique contouring reduces or eliminates stressed areas during storage, such as sharp creases, which may be deleterious to the elastomeric material during aging. The shoe cover of the present invention has been found to be much less prone to folding or creasing of the elastomeric material in either the as-dipped configuration or in the reversed configuration. This is believed to be due to the smaller radius of the edges of the form on which the shoe cover is deposited, creating corresponding radius in the finished shoe cover which are more resistant to distortion and creasing.

A shoe cover according to the invention, for maintaining sterility during a medical procedure and for protecting a wearer from contaminated fluids comprises a one piece unit of thin elastomeric material. The one piece unit comprises a pair of side panels in substantially parallel relation to each other. Each of the side panels has a foot shaped portion, an ankle shaped portion and an outer perimetric edge, the ankle shaped portion having an upper edge as part of the outer perimetric edge. A bead shaped perimetric section joins the two side panels at their respective perimetric edges, except at the upper edge, thereby forming an enclosure open only at the ankle portion upper edges. A traction enhancing embossed pattern is formed on a lower portion of the foot shaped portion of the side panels.

Preferably, the elastic material comprises natural rubber latex. However, other elastomers such as nitrile and neoprene may also be employed. The material is preferably between 5 and 15 mils thick, and more preferably between 10 and 12 mils. Such lightweight shoe covers provide adequate strength for a single use and are economical enough to be disposable. To further improve traction, the material preferably comprises a friction enhancing agent, such as amorphous fumed silica, dispersed therein. Preferably, the perimetric portion is at least partially convex in cross-section and the side portions are spaced apart by about one half inch.

The present invention further comprises a novel method for forming a shoe cover capable of maintaining sterility during a medical procedure and of protecting a wearer from contaminated fluids. The method comprises providing a shoe cover form which has substantially parallel lateral sides and a peripheral edge thereabout, which comprises a foot forming portion and an ankle forming portion, which has recesses covering substantially all of the foot forming portion of the first and second sides, and which has a textured surface on a lower portion of the foot forming portion. The method further comprises dipping the form into a solution of coagulant, drying the coagulant, dipping the form into a liquid elastomer preparation, drying the elastomer, and removing the shoe cover from the form.

BRIEF DESCRIPTION OF THE DRAWINGS

With reference to the accompanying sheets of drawings.

DETAILED DESCRIPTION OF THE PREFERRED EMBODIMENTS

Figure 1:
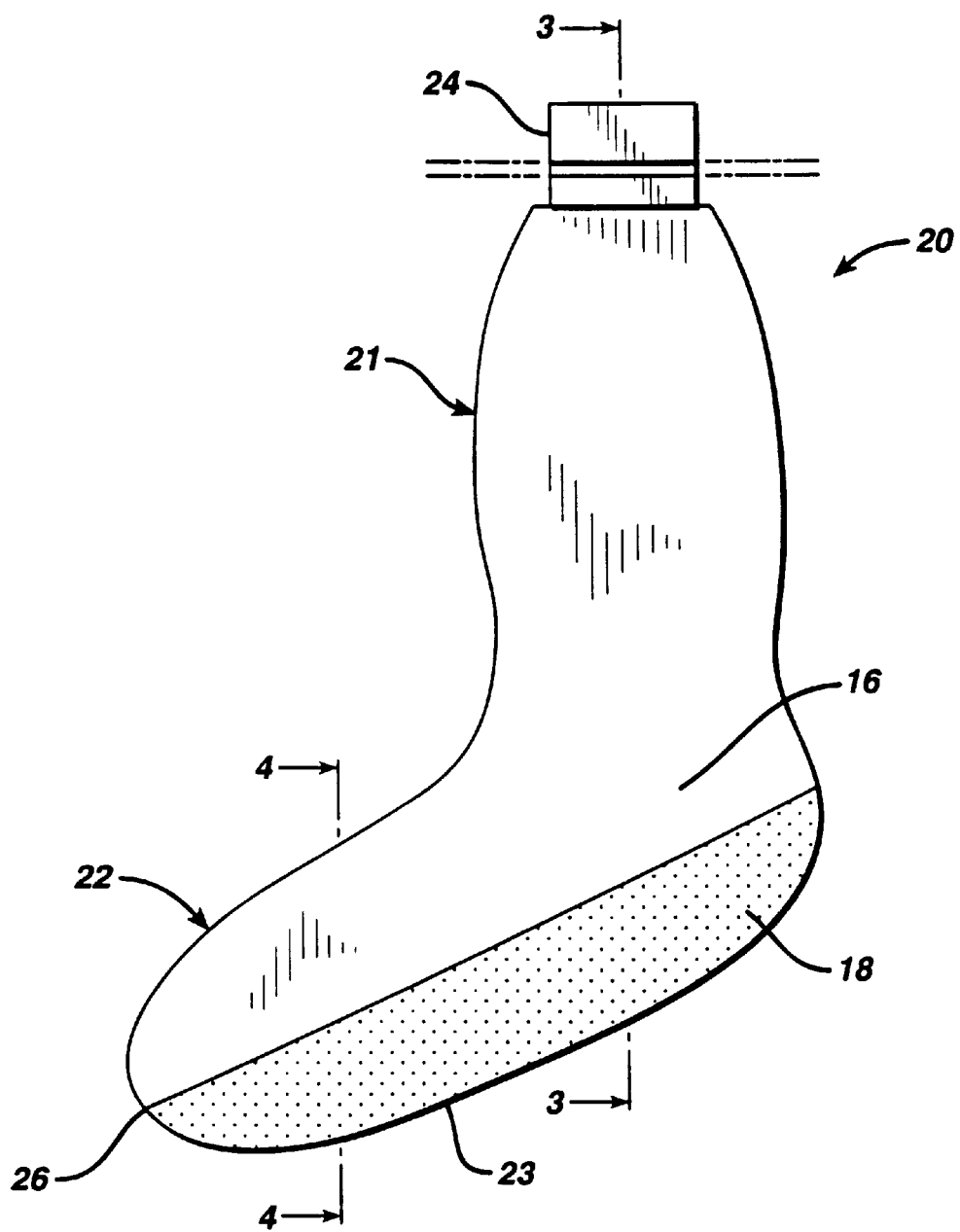
FIG. 1 is a front elevational view of a shoe cover form for producing the unique shoe cover structure of the present invention.

With reference to the accompanying drawings, FIGS. 1 through 4 illustrate a form 20 for forming a unique shoe cover 30 according to the invention in a dipping operation. The form 20 comprises a leg-forming portion 21 and a foot-forming portion 22. At the end of the leg forming portion 21, remote from foot-forming portion 22, is provided a mounting block 24 which may be utilized to attach the form 20 to a rack, or other similar support member, on a dipping machine (not shown) of a type well known in the art of dipping. The unique shoe cover form 20 has applicability with virtually all types of equipment used in the dipping and other elastomeric deposition arts.

Figure 2:
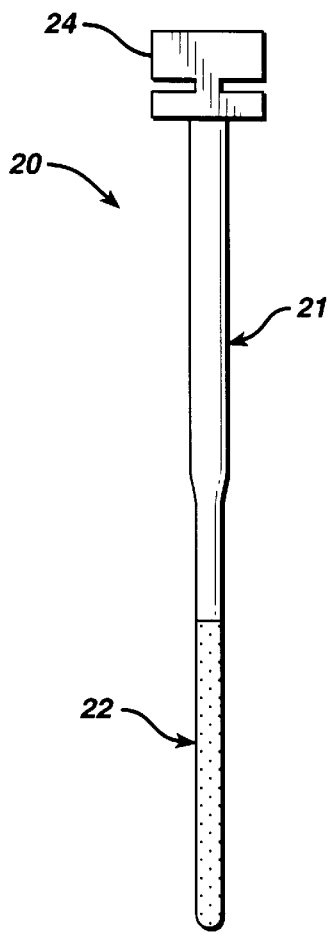
FIG. 2 is a side elevational view of the shoe cover form of FIG. 1.
Figure 3:
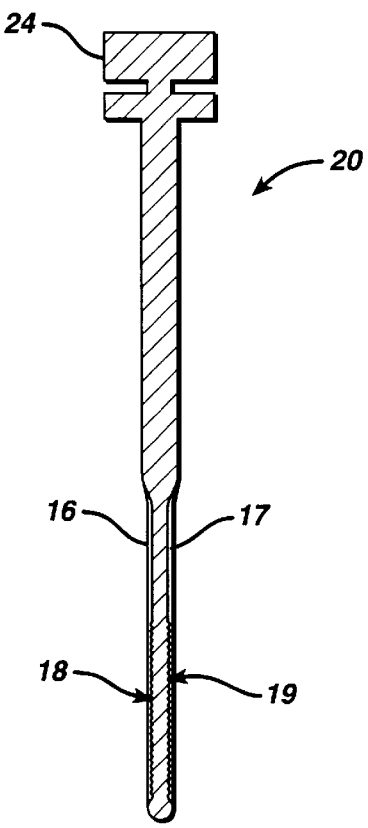
FIG. 3 is a cross sectional view taken along line 3—3 of FIG. 1.
Figure 4:
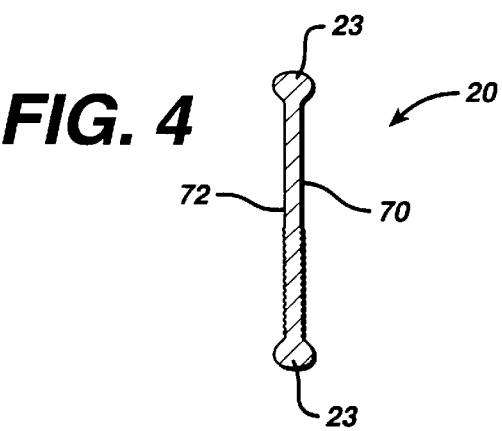
FIG. 4 is a cross sectional view taken along line 4—4 of FIG. 1.

The overall thickness of the form 20, as best seen in FIGS. 2 and 3, is extremely small compared with that of a conventional shoe cover-making form. The foot-forming portion 22 is preferably about ½ inch thick as compared with about 3¾ inches for conventional shoe cover forms. The form 20 is essentially uniform in thickness from the block 24 to the tip 26 of foot-forming portion 22, except for recesses 16 and 17 formed in opposed sides 70 and 72 of the foot-forming portion 22. The recesses 16 and 17 cover essentially the entire surfaces of foot-forming portion 22 except for a peripheral edge 23 which surrounds the recesses 16 and 17(see also FIG. 4). The dimensions of the peripheral edge 23 are not critical, however, the edge 23 is preferably smoothly curved to avoid any sharp transitions that could result in pinholes or other failures in the elastomeric material deposited on the form 20.

Although the form 20 is much narrower than conventional shoe cover forms, it will be appreciated that the recesses 16 and 17 provide additional surface area which, when combined with the surface of the peripheral edge 23, equals the desired surface area of the elastomeric shoe cover 30 made thereon. The textured finish 18 and 19, which provides the finished shoe cover 30 with a rough surface, covers approximately the bottom half of the recesses 16 and 17 and the bottom peripheral edge 23 of the foot-forming portion 22.

The configuration of form 20 is obviously very important to the present invention in that it permits the elimination of many of the disadvantages associated with conventional shoe cover forms. For example, the relatively thin form 20 enables the use of a much larger number of forms on a single shoe cover making assembly. Other economic advantages include a reduction in molding costs necessary to produce the relatively small forms; a reduction in power required to manipulate the forms; and increased efficiency and uniformity of heat transfer achievable with a solid form of the type contemplated by this invention, as opposed to a hollow conventional form.

Figure 6:
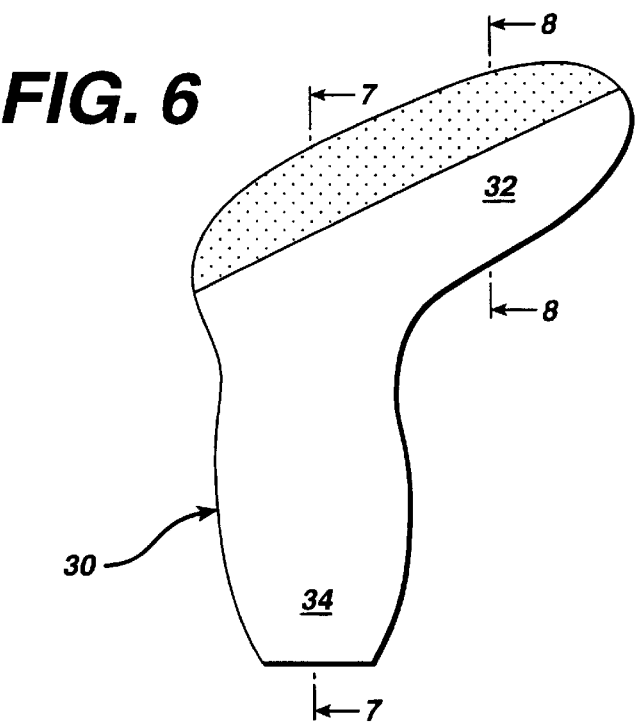
FIG. 6 is a front elevational view of an inverted shoe cover of the present invention.
Figure 7:
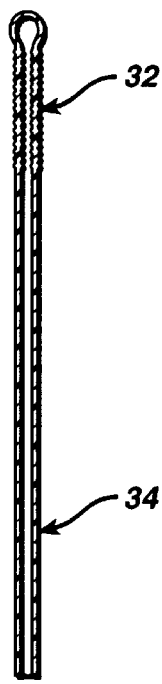
FIG. 7 is a cross, sectional view taken along line 7—7 of FIG. 6.

Turning to FIGS. 6 and 7, the unique shoe cover 30 of the present invention comprises generally a foot portion 32 and an open end leg portion 34. Approximately the bottom half of the foot portion 32 is a rough surface 74 which will directly contact a floor to promote better grip, especially when the floor is wet.

Figure 8:
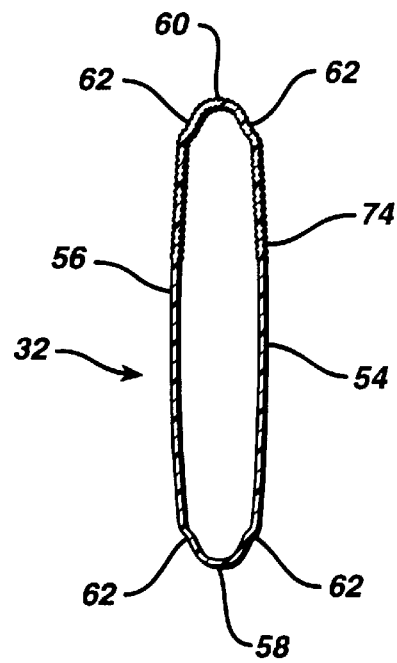
FIG. 8 is a cross sectional view taken along line 8—8 in FIG. 6.

The cross sectional configuration of the foot portion 32 is illustrated in FIG. 8, wherein it has a top curved section 58, a bottom curved section 60 and curved side sections-54 and 56. The top section 58 and bottom section 60 are formed by the peripheral edge 23 of the shoe cover form 20. The curved side sections 54 and 56 are formed, respectively, by the recesses 16 and 17 of the shoe cover form 20. As seen in FIG. 8, each pair of adjacent convexly curved sections is connected by an inwardly curved, or concave, section 62.

The unique shoe cover 30 illustrated in FIG. 6 is constructed by depositing on the form 20 one or more layers of elastomeric material. The preferred elastomeric materials usable with this invention are natural rubber latex, nitrile and neoprene. To reduce the natural slickness of the elastomeric material, a friction enhancing agent is preferably mixed into the liquid elastomer. One such suitable agent is amorphous fumed silica, such as Cabo-O-Sperse®, available from Cabot Corp., Cab-O-Sil Division, Tuscola, Ill. It is preferably stabilized with ammonia, or alternatively with potassium hydroxide or sodium hydroxide. The concentration of Cab-O-Sperse® in the liquid elastomer is preferably between 0 and 15 parts per hundred of rubber (phr), and more preferably between 3 and 10 phr.

The elastomer is deposited in a somewhat conventional manner utilizing a latex dipping procedure which is well known in the dipping art. Although the shoe cover form 20 may be constructed of porcelain, aluminum or other suitable materials, the preferred material of construction is polypropylene. Because of the unique flat, solid structure of the shoe cover form 20, it is possible to utilize materials that have not heretofore been available in the molding of elastomeric shoe covers.

Figure 5:
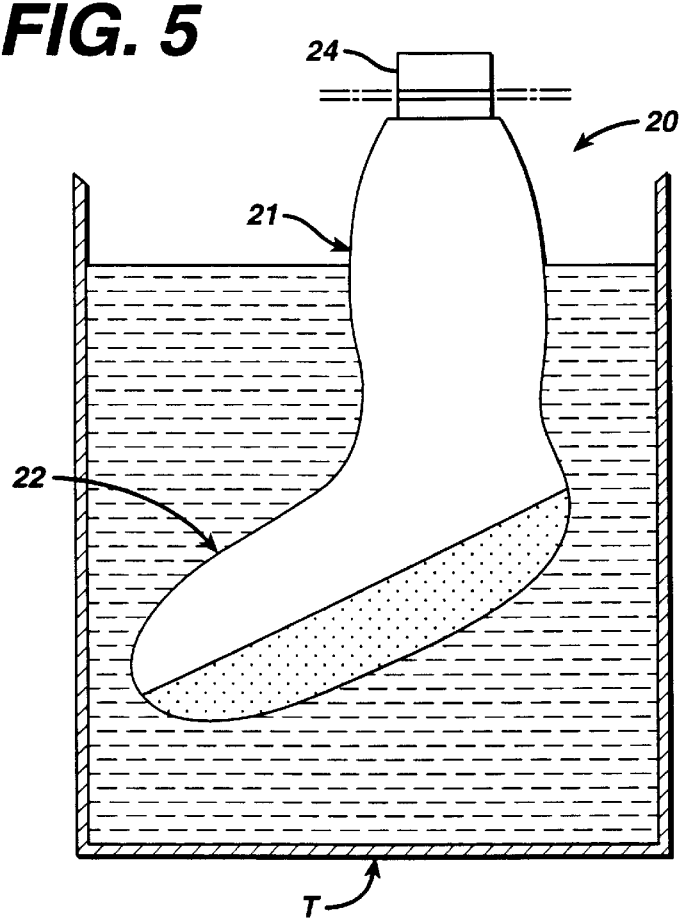
FIG. 5 illustrates the deposition of elastomeric material onto the shoe cover form of FIG. 1.

Referring to FIG. 5, the shoe cover form 20 is illustrated in an immersed condition within a latex dipping tank T filled with natural rubber latex. After a suitable dwell time within tank T the shoe cover form 20 is removed and subjected to the conventional procedures of drying and curing. Following the curing operation, the shoe cover 30 may be stripped from the form 20 and reversed to form the shoe cover 30 illustrated in FIG. 6. Because of the unique concave configuration of the form 20, during the drying and curing operations the elastomeric material of the shoe cover 30 will separate from form 20 to facilitate the stripping operation.

While the invention has been described with regard to a particular embodiment thereof, those skilled in the art will understand, of course, that the invention is not limited thereto since modifications can be made by those skilled in the art, particularly in light of the foregoing teachings. Reasonable variation and modification are possible within the foregoing disclosure of the invention without the departing from the spirit of the invention.

What is claimed is:

1. A shoe cover for maintaining sterility during a medical procedure and for protecting a wearer from contaminated fluids, the shoe cover comprising a one piece unit of thin elastomeric material comprising:

a first side panel and a second side panel in substantially parallel relation to each other, each side panel having a foot shaped portion, an ankle shaped portion and an outer perimetric edge, the ankle shaped portion having an upper edge as part of the outer perimetric edge;

a bead shaped perimetric section joining said first side panel and said second side panel at their respective perimetric edges, except at the upper edge, thereby forming an enclosure open only at the ankle portions upper edges; and a traction enhancing embossed pattern being formed on a lower portion of the foot shaped portion of the side panels.

2. A shoe cover according to claim 1 wherein the elastic material comprises natural rubber latex.

3. A shoe cover according to claim 2 wherein the wherein the material is between 5 and 15 mils thick.

4. A shoe cover according to claim 3 wherein the material is between 10 and 12 mils thick.

5. A shoe cover according to claim 2 wherein the material further comprises a friction enhancing agent dispersed therein.

6. A shoe cover according to claim 5 wherein the friction enhancing agent is silica based.

7. A shoe cover according to claim 5 wherein the friction enhancing agent comprises amorphous fumed silica.

8. A shoe cover according to claim 1 wherein the perimetric portion is at least partially convex in cross-section.

9. A shoe cover according to claim 1 wherein the side portions are spaced apart by about one half inch.

10. A shoe cover according to claim 1 formed by dipping a flat form having first and second substantially parallel lateral sides and a peripheral edge thereabout, which comprises a foot forming portion and an ankle forming portion, and which has recesses covering substantially all of the foot forming portion of the first and second sides, into a bath of liquid elastomer.

* * * * *